United States Patent
Chung

(10) Patent No.: US 6,811,666 B2
(45) Date of Patent: Nov. 2, 2004

(54) AMINE ACID ZWITTERION ADDITIVE FOR A CATHODIC ELECTROCOATING COMPOSITION

(75) Inventor: Ding Yu Chung, Rochester Hills, MI (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 417 days.

(21) Appl. No.: 10/081,302

(22) Filed: Feb. 20, 2002

(65) Prior Publication Data

US 2003/0155242 A1 Aug. 21, 2003

(51) Int. Cl.$^7$ .............................................. C25D 13/10
(52) U.S. Cl. ..................... 204/489; 204/506; 528/48
(58) Field of Search ................. 204/489, 506; 528/48

(56) References Cited

U.S. PATENT DOCUMENTS

| | | |
|---|---|---|
| 3,935,087 A | 1/1976 | Jerabek et al. |
| 3,937,679 A | 2/1976 | Bosso et al. |
| 3,962,165 A | 6/1976 | Bosso et al. |
| 3,984,299 A | 10/1976 | Jerabek |
| 4,001,101 A | 1/1977 | Bosso et al. |
| 4,001,156 A | 1/1977 | Bosso et al. |
| 4,038,166 A | 7/1977 | Bosso et al. |
| 4,191,674 A | 3/1980 | Wismer et al. |
| 4,308,188 A | 12/1981 | Wicks et al. |
| 4,370,461 A | 1/1983 | Burton et al. |
| 4,419,467 A | 12/1983 | Wismer et al. |
| 4,468,307 A | 8/1984 | Wismer et al. |
| 4,575,524 A | 3/1986 | Anderson et al. |
| 4,579,886 A | 4/1986 | Otsuki et al. |
| 4,904,361 A | 2/1990 | Motohashi et al. |
| 5,066,689 A | 11/1991 | Patzschke et al. |
| 5,348,635 A | 9/1994 | Laugal et al. |
| 5,767,191 A | 6/1998 | Zawacky et al. |
| 5,948,229 A | 9/1999 | Zwack et al. |

OTHER PUBLICATIONS

Copy of International Search Report (PCT/US03/05386) dated Feb. 7, 2003.

*Primary Examiner*—Kishor Mayekar
(74) *Attorney, Agent, or Firm*—Steven C. Benjamin

(57) ABSTRACT

This invention is directed to an improved aqueous cathodic electrocoating composition and a method for the electrodeposition of this composition; the composition comprises a cathodic electrodepositable composition comprising a binder of (a) a cathodically electrodepositable film forming resin and (b) a polyisocyanate crosslinking agent blocked with a compound that is non-hazardous and non-air polluting, such as, an alkoxy alkanol or an alkyl alcohol; wherein the improvement comprises the use of 0.1–5.0% by weight, based on the weight of the binder, of a water miscible amine acid zwitterion additive which is the reaction product of an amine acid and an alkylglycidy ether.

10 Claims, No Drawings

AMINE ACID ZWITTERION ADDITIVE FOR A CATHODIC ELECTROCOATING COMPOSITION

BACKGROUND OF THE INVENTION

1. Field of the Invention

This invention is directed to an electrocoating composition having an improved cure that uses a blocked isocyanate crosslinking agent blocked with a non-hazardous and non-air polluting compound.

2. Description of the Prior Art

Coating of electrically conductive substrates by an electrodeposition process (also called an electrocoating process) is well known and an important industrial process used particularly in the manufacture of automobiles and trucks. In the electrodeposition of primers, an article, such as an auto body or truck body or parts thereof, is immersed in an aqueous electrocoating bath of an electrocoating composition that contains an aqueous emulsion of a film forming polymer. The article to be electrocoated acts as an electrode resulting in an electrical current being passed between the article and a counter electrode, which is in contact with the aqueous emulsion, until a coating with the desired thickness is deposited on the article. In a cathodic electrocoating process, the article to be coated is the cathode and the counter electrode is the anode. The article to be coated is immersed and passed through the bath over a period of time (time in the bath controls the thickness of the coating that is deposited) and then the coated article is removed from the bath, rinsed with water and baked to form a primer coating on the article.

The aqueous emulsion of film forming polymer used in cathodic electrocoating process also is well known. The film forming polymer typically is a polyepoxide that has been extended and formed into an adduct having amine groups that are subsequently neutralized with an acid and blended with a crosslinking agent, such as a blocked polyisocyanate crosslinking agent. The aqueous electrocoating bath contains the film forming polymer, a blocked crosslinking agent, a pigment paste or a pigment dispersion, coalescing solvents and other additives.

It would be very desirable to use a blocked isocyanate crosslinking agent which utilizes a non-hazardous, non-polluting blocking agent that does not have to be recovered and recycled or disposed of in some manner. Such blocking agents are known but require the baking temperatures for the deposited electrocoating composition to be increased during curing in order to remove these known blocking agents and thereby activate the isocyanate crosslinking agent. Although it is not a problem to increase baking temperatures for small metal parts that are electrocoated but increasing baking temperatures for auto and truck bodies present a major problem because such increases result in significant increases in energy consumption and in manufacturing costs. It would be desirable to use a blocking agent for the isocyanate crosslinking agent that is non-hazardous and non-air polluting, but yet would allow the auto and truck bodies to be baked at normal temperatures typically used in the automobile and truck manufacturing process.

SUMMARY OF THE INVENTION

This invention is directed to an improved aqueous cathodic electrocoating composition and a method for the electrodeposition of this composition; the composition comprises a binder of (a) a cathodically electrodepositable film forming resin and (b) a polyisocyanate crosslinking agent blocked with a compound that is non-hazardous and non-air polluting, such as an alkoxy alkanol or an alkyl alcohol; wherein the improvement comprises the use of 0.1–5.0% by weight, based on the weight of the binder, of a water miscible amine acid zwitterion additive that is the reaction product of an amine acid and an alkylglycidyl ether.

DETAILED DESCRIPTION OF THE INVENTION

A typical auto or truck body is produced from a steel sheet or plastic or composite substrate. If steel is used, it is first treated with an inorganic rust-proofing compound, such as zinc or iron phosphate, and then a primer coating is applied generally by electrodeposition. Plastic and composite substrates can also be electrocoated with a primer provided the substrate is first made electrically conductive. Typically, the electrocoating primer is comprised of epoxy modified resins that are crosslinked with a polyisocyanate and applied by a cathodic electrodeposition process. Optionally, a second primer can be applied over the electrodeposited primer, usually by spraying, to provide better appearance and/or improved adhesion of a base coating or a mono coating to the primer. A mono coating of a pigmented coating composition then can subsequently be applied, but the preferred coating comprises a pigmented base coating over which a clear top coating is applied. Usually, each coating is cured after it is applied by being baked at elevated temperatures. It is generally known that a clear top coating can be applied over the base coating and both coatings cured together at an elevated temperature.

The novel cathodic electrocoating composition of this invention contains a binder of 30–70% by weight of cathodic electrodepositable film forming resin of a polyepoxy amine adduct neutralized with an acid and correspondingly, 70–30% by weight of a blocked polyisocyanate which is blocked with non-hazardous and non-air polluting blocking agent. By incorporating 0.1–5% by weight, based on the weight of the binder, of a water miscible amine acid zwitterion additive that is the reaction product of an amine acid and an alkylglycidyl ether into the electrocoating composition of this invention, the composition has the advantage of being cured at conventional baking temperatures of 125–175° C. Preferably, 0.5–2.0% by weight, based on the weight of the binder, of the water miscible amine acid zwitterion additive is incorporated into the composition.

The amine acid zwitterion has the formula

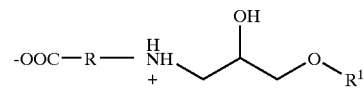

where R is an aromatic or aliphatic radical, and $R^1$ is an aliphatic radical, preferably having 1–25 carbon atoms. The amine acid zwitterion additive is the reaction product of equal molar amounts of an amine acid and an alkylglycidyl ether.

Typically the amine acid has the formula HOOC—R—$NH_2$ where R is an aliphatic radical or an aromatic radical. Typical amine acids that can be used are as follows: para aminobenzoic acid, glycine, alanine and valine.

The alkylglycidyl ether has the formula

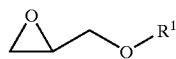

where $R^1$ is an aliphatic radical, preferably having 1–25 carbon atoms and an epoxy equivalent weight of 200–500. One preferred alkylglycidyl ether has an equivalent weight of 300–325. One typically useful alkylglycidyl ether is Araldite® DY 025 from Ciba Specialty Chemicals.

The amine acid zwitterion additive is prepared by dissolving the amine acid in a solvent, such as, 2-butoxyethanol, and subsequently blending the dissolved acid with the alkylglycidyl ether and then the blended composition is reacted at a temperature of 80–120° C. for 0.5–2.0 hours to form an additive. Any conventional solvents can be used provided they dissolve the constituents and the resulting amine acid zwitterion additive.

Typically an emulsion of a polyepoxy amine adduct is used in a cathodic electrocoating composition. The adduct is neutralized with an acid to form a water soluble or water dispersible product and is blended with a crosslinking agent. Generally, a metal catalyst, such as, dibutyl tin oxide, is addled to the electrocoating composition.

Useful polyepoxy amine adducts are generally disclosed in U.S. Pat. No. 4,419,467 which is incorporated herein by reference.

Typical epoxy resins that are used to form the adduct have an epoxy equivalent weight of about 100–2,000. Typically useful epoxy resins are epoxy resins of diglycidyl ether and bisphenol A, such as, Epon® 828, Epon® 1001 and Epon® 1002F having epoxy equivalent weight of 188, 500 and 650, respectively. Other epoxy resins that can be used are aliphatic epoxy resins, such as neopentyl glycol diglycidyl ether, 1,4 butanediol diglycidyl ether, 1,4 cyclohexanedimethanol diglycidyl ether, hydrogenated bisphenol A diglycidyl ether. These epoxy resins can be extended with polyhydric phenols or other cyclic polyols or cycloaliphatic polyols, such as bisphenol A, hydrogenated bisphenol A, ethoxylated bisphenol A and cyclohexane diols.

Amines, such as, primary, secondary and tertiary amines, monoamines, polyamines and hydroxy amines can all be used to form the cationic groups of the adduct. Typically ethylene diamine, diethylene triamine, piperizine, ethanol amine, methyl ethanol amine and diethanol amine are used. Diketimine, which is the reaction product of diethylene triamine and methyl isobutyl ketone, also can be used.

Typical acids that can be used to neutralize the polyepoxy amine adduct are organic acids such as lactic acid, acetic acid, carbonic acid, and formic acid, and other acids, such as phosphoric acid, sulfamic acid and sulfonic acid.

The isocyanate crosslinking agents used are those well known in the art, such as aliphatic, cycloaliphatic and aromatic polyisocyanates, such as hexamethylene diisocyanate, cyclohexamethylene diisocyanate, toluene diisocyanate, metheylene diphenyl diisocyanate, polymeric methylene diphenyl diisocyanate and isocyanurate of hexamethylene diisocyanate.

The isocyanate crosslinking agent is reacted with a blocking agent to prevent a crosslinking action from occurring in the electrocoating bath and as the composition is being electrodeposited. When the coating is being cured during baking, the isocyanate is unblocking and the resulting coating or finish is crosslinked. The blocking agents that are used are non-hazardous non-air polluting agents such as, alkoxy alkanols, e.g., alkoxy propanol, like 2-methoxy propanol, 2-butoxy propanol and 2-propoxy propanol. Alkyl alcohols having 1-3 carbon atoms in the alkyl group, such as methanol, ethanol, propanol, isopropanol can also be used.

Without the presence of the amine acid zwitterion composition, the above blocking agents could not be used under conventional baking temperatures of 125–175° C. since these blocking agents would not be unblocked at these temperatures.

Metal catalysts are used in the cathodic electrocoating composition in amounts of 0.1–2.0% by weight, based on the weight of the binder. Typically useful catalysts are dibutyl tin oxide, dibutyl tin dilaurate, and alkyl tin diacetyl acetonate.

Pigments are incorporated into the cathodic electrocoating composition by forming a pigment paste which is then blended with the other components of the cathodic electrocoating composition, such as the cathodic polyepoxy amine adduct and blocked crosslinking agent, coalescing solvents, water and other additives. The pigment paste is prepared by grinding or dispersing a pigment in a pigment dispersant; optionally, other ingredients are added, such as wetting agents, surfactants, and defoamers. Grinding is continued until a Hegman grinding gauge reading of about 6–8 is reached. The pigment paste or dispersant generally is used in amounts of 1–15% by weight, based on the weight of the binder of the electrocoating composition.

Typical pigments that are used in cathodic electrocoating compositions include titanium dioxide, carbon black, iron oxide, clay and the like. Pigments with high surface areas and oil absorbencies should be used judiciously because they can have an undesirable effect on coalescence and flow of the electrodeposited coating.

The cathodic electrocoating composition of this invention can contain optional ingredients, such as wetting agents, surfactants, and defoamers. Examples of surfactants and wetting agents include, alkyl imidazoles and acetylenic alcohols. These optional ingredients, when present, constitute 0.1 to 2.0% by weight of the binder solids of the composition.

Optionally, plasticizers can be used to promote flow. Examples of useful plasticizers are high boiling water immiscible materials, such as, ethylene or propylene oxide adducts of nonyl phenols of bisphenol A. Plasticizers are usually used at levels of 0.1 to 15% by weight, based on binder solids.

The electrocoating composition is an aqueous dispersion. The term "dispersion" as used within this context is believed to be a two-phase translucent or opaque aqueous resinous binder system in which the binder is in the dispersed phase and water in the continuous phase. The average particle size diameter of the binder phase is about 0.1 to 10 microns, preferably less than 5 microns. The concentration of the binder in the aqueous medium is not critical, but ordinarily the major portion of the aqueous dispersion is water. The aqueous dispersion usually contains about 3 to 50%, preferably 5 to 40% by weight binder solids. Concentrates of the composition that are shipped to a manufacturing site are diluted with water to provide an electrocoating bath having a binder solids content in the range of 10 to 30% by weight.

Besides water the aqueous medium of the cathodic electrocoating composition contains coalescing solvent(s). Useful coalescing solvents include hydrocarbons, alcohols, polyols and ketones. Preferred coalescing solvents include monbutyl and monhexyl ethers of etheylene glycol and phenyl ether of propylene glycol. The amount of coalescing solvent is not unduly critical and is generally between 0.1 to 15% by weight, preferably 0.5 to 5% by weight, based on the total weight of the binder solids in the composition.

The conditions for electrodeposition of the novel composition are similar to those typically used in a cathodic electrodeposition process. The applied voltage typically is between 50 and 500 volts and the current density is between 0.5 and 15 amperes per square foot which tends to decrease during electodeposition as an insulating film is formed. Typically, the composition is cured by baking at an elevated temperature of 125–175° C. for about 5 to 30 minutes.

The following examples illustrate the invention. All parts and percentages unless otherwise indicated are on a weight basis.

EXAMPLE 1

Preparation of Chain Extended Polyepoxide Aqueous Emulsion

The following ingredients were charged into a reaction vessel: 453 parts Epon® 828 (epoxy resin of diglycidyl ether of bisphenol A having an epoxy equivalent weight of 188); 130 parts bisphenol A; 163 parts Synfac® 8009 (ethoxylated bisphenol A having a hydroxyl equivalent weight of 248); 39 parts xylene and 0.9 parts dimethyl benzyl amine. The resulting reaction mixture was heated to 160° C. under a nitrogen blanket and held at this temperature for one hour. 1.5 parts dimethyl benzyl amine were added and the mixture was held at 147° C. until an epoxy equivalent weight of 1121 was reached. 647 parts blocked isocyanate crosslinker solution (2-methoxypropanol blocked Mondur® MR, a polymeric methylene diphenyl diisocyanate from Bayer having a 75% solids content) were added. When the reaction mixture temperature cooled to 107° C., 49 parts of diketimine (reaction product of diethylenetriamine and methyl isobutyl ketone at 72.7% solids) and 43 parts of methyl ethanol amine were added. The resulting mixture was held at 120° C. for one hour. The resin solution was emulsified in a water solution containing 60 parts of 70% methane sulfonic acid, 21 parts of a surfactant mix (a mixture of 120 parts of alkyl imidazoline, 120 parts of acetylenic alcohol and 120 parts butoxyethanol) and 2008 parts deionized water. The resulting emulsion was stripped to remove organic solvents. The emulsion had a solids content of 38%.

Preparation of Anticrater Additive

An anticrater additive was prepared by charging the following constituents into a suitable reaction vessel: 2322 parts of Jeffamine® D-2000 (polyoxypropylenediamine having an amine equivalent weight of 1000 from Huntsman Company) and 188 parts of Epon® 828 (epoxy resin of diglycidyl ether of bisphenol A having an epoxy equivalent weight of 188) were added under a nitrogen atmosphere and heated to 90° C., followed by the addition of a solution of 859 parts by weight of Epon® 1001 (epoxy resin of diglycidyl ether of bisphenol A having an epoxy equivalent weight of 500) in 345 parts by weight of 2-butoxyethanol. The resulting reaction mixture was dispersed by combining 68 parts of acetic acid and 5354 parts by weight deionized water.

Preparation of Amine Acid Zwitterion Additive 108 parts of para-aminobenzoic acid were dissolved in 354 parts of 2-butoxyethanol at 115° C. The temperature was cooled to 93° C. and 246 parts of Araldite DY 025 (alkylglycidyl ether with an epoxy equivalent weight of about 312) was slowly added and the temperature was kept between 93–104° C. The resulting mixture was held at 100° C. until the combined amine and epoxy equivalent was equal to 898. The resulting resin was emulsified in 300 parts of deionized water and had a solids content of 35%.

Preparation of Conventional Quaternizing Agent

The quaternizing agent was prepared by adding 87 parts dimethylethanolamine to 320 parts 2-ethyl hexanol half-capped toluene diisocyanate in a reaction vessel at room temperature. An exothermic reaction occurred and the reaction mixture was stirred for one hour at 80° C. 118 parts aqueous lactic acid solution (75% nonvolatile content) was then added followed by the addition of 39 parts 2-butoxyethanol. The reaction mixture was held for about one hour at 65° C. with constant stirring to form the quaternizing agent.

Preparation of a Pigment Grinding Vehicle

A pigment grinding vehicle was prepared by charging into a suitable reaction vessel 710 parts of Epon® 829 (epoxy resin of diglycidyl ether of bisphenol A having an epoxy equivalent weight of 190–203) and 210 parts of bisphenol A under a nitrogen blanket and heated to 150–160° C. to initiate an exothermic reaction. The exothermic reaction was continued for about 1 hour at the above temperature. The reaction mixture was then cooled to 120° C. and 496; parts of 2-ethylhexanol half-capped toluene diisocyanate was added. The temperature of the reaction mixture was held at 110–120° C. for one hour, followed by the addition of 1095 parts of 2-butoxy ethanol, then the reaction mixture was cooled to 85–90° C. and 71 parts of deionized water was added followed by the addition of 496 parts of the above prepared quaternizing agent. The temperature of the reaction mixture was held at 85–90° C. until an acid value of about 1 was obtained.

Preparation of Pigment Paste

A pigment paste was prepared by charging the following ingredients into a suitable mixing vessel:

|  | Parts by Weight |
|---|---|
| Pigment Grinding Vehicle (prepared above) | 609 |
| Deionized Water | 1245 |
| Dibutyl tin dioxide | 145 |
| Carbon black pigment | 20 |
| Aluminum silicate pigment | 149 |
| Titanium dioxide pigment | 760 |
| Aluminum triphosphate | 69 |

The above ingredients were mixed until a homogeneous mixture was formed and then charged into a sandmill and ground until a Hegman reading of 7 or greater was obtained. The resulting pigment paste had a non-volatile content of 50%.

Preparation of Electrocoating Baths

|  | Parts by Weight Bath I | Parts by Weight Bath II |
|---|---|---|
| Chain Extended Polyepoxide Aqueous Emulsion (prepared above) | 788 | 780 |
| Anticrater Additive (prepared above | 45 | 45 |
| Amine Acid Zwitterion Additive (prepared above) | 0 | 9 |
| Pigment Paste (prepared above) | 130 | 130 |

-continued

Preparation of Electrocoating Baths

| | Parts by Weight Bath I | Parts by Weight Bath II |
|---|---|---|
| Deionized Water | 937 | 937 |
| Total | 1900 | 1901 |

The electrocoating baths I and II were prepared by mixing the above ingredients together. The pH of each of the baths was adjusted to 6.0 to 6.05, the solid of the baths was 20%, and the bath's pigment to binder ratio was 15 to 100. The temperature of each of the baths was maintained at about 33° C. during the electrocoating process. 2 sets of 2 phosphated steel panels were electrocoated separately in each bath at 200 volts and coatings were obtained on each panel having a wet film thickness of 0.92 mils (23.3 microns). The panels were baked at 166° C. for 17 minutes to form a smooth film. The cured coating on of each of the panels was tested with a methyl ethyl ketone double rub test wherein a double rub for test purposes involved rubbing a which a cloth soaked in methyl ethyl ketone over the surface the panel two times. The panels coated in Bath I, which did not contain the amine acid zwitterion additive, only withstood 2 double rubs. In contrast, the panels coated in Bath II, which contained the amine acid zwitterion additive (the invention), withstood 300 double rubs showing a significant improvement in curing.

What is claimed is:

1. An aqueous cathodic electrocoating composition comprising a binder of (a) a cathodically electrodepositable film forming resin and (b) a polyisocyanate crosslinking agent blocked with a non-hazardous, non-air polluting compound and 0.1–5.0% by weight, based on the weight of the binder, of a water miscible amine acid zwitterion additive comprised of a reaction product of an amine acid and an alkylglycidy ether.

2. The aqueous cathodic electrocoating composition of claim 1 in which the non-hazardous, non-air polluting compound is selected from the group consisting of an alkoxy alkanol and an alkyl alcohol.

3. The aqueous cathodic electrocoating composition of claim 2 in which the amine acid zwitterion additive is a reaction product of an amine acid of the formula HOOC—R—NH$_2$ and an alkyl glycidyl ether of the formula

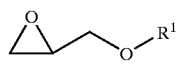

where R is selected from the group consisting of an aliphatic radical and an aromatic radical and R$^1$ is an aliphatic radical.

4. The aqueous cathodic electrocoating composition of claim 3 in which the amine acid consists of para aminobenzoic acid and the alkyl glycidyl ether has an epoxy equivalent weight of 200–500.

5. The aqueous cathodic electrocoating composition of claim 2 in which the amine acid zwitterion additive has the formula of

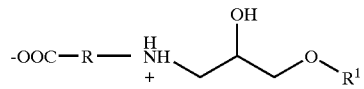

where R is selected from the group consisting of an aliphatic radical and an aromatic radical and R$^1$ is an aliphatic radical.

6. The aqueous cathodic electrocoating composition of claim 2 in which the non-hazardous non-air polluting compound is alkoxy propanol.

7. The aqueous cathodic electrocoating composition of claim 2 in which the non-hazardous, non-air polluting compound is an alkyl alcohol having 1–3 carbon atoms in the alkyl group.

8. The aqueous cathodic electrocoating composition of claim 2 in which the cathodically electrodepositable film forming resin comprises a polyepoxy amine adduct neutralized with an acid selected from the group consisting of formic acid, acetic acid, lactic acid, phosphoric acid, sulfamic acid, sulfonic acid and mixtures thereof.

9. The aqueous cathodic electrocoating composition of claim 1 in which the binder comprises 30 to 70% by weight based on the weight of the binder of the cathodically electrodepositable film forming resin comprising a polyepoxy amine adduct neutralized with an acid selected from the group consisting of formic acid, acetic acid, lactic acid, phosphoric acid, sulfamic acid, sulfonic acid and mixtures thereof and 30 to 70% by weight of the binder of the polyisocyanate crosslinking agent blocked with the non-hazardous, non-air polluting compound selected from the group consisting of an alkoxy alkanol and an alkyl alcohol having 1–3 carbon atoms in the alkyl group and in which the water miscible amine acid zwitterion additive comprises the reaction product of an amine acid of the formula HOOC—R—NH$_2$ and an alkyl glycidyl ether of the formula

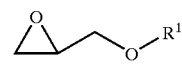

where R is selected from the group consisting of an aliphatic radical and an aromatic radical and R$^1$ is an aliphatic radical having 1–25 carbon atoms.

10. A process for cathodically electrocoating an electrically conductive object which comprises the steps of (1) immersing the object in a bath of the electrocoating composition of claim 1 and (2) cathodically electrodepositing a film on the object, (3) removing the coated object and (4) baking the coated object at 125–175° C. to form a continuous film thereon.

* * * * *